(12) United States Patent
Kim et al.

(10) Patent No.: US 11,837,972 B2
(45) Date of Patent: Dec. 5, 2023

(54) SOFT ROBOT USING DIAMAGNETIC LEVITATION

(71) Applicant: KOREA ADVANCED INSTITUTE OF SCIENCE AND TECHNOLOGY, Daejeon (KR)

(72) Inventors: Taek-Soo Kim, Daejeon (KR); Ji Hun Kim, Daejeon (KR); Jae-Bum Pyo, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 17/898,668

(22) Filed: Aug. 30, 2022

(65) Prior Publication Data

US 2023/0068348 A1  Mar. 2, 2023

(30) Foreign Application Priority Data

Aug. 31, 2021 (KR) .................... 10-2021-0115199
May 24, 2022 (KR) .................... 10-2022-0063214

(51) Int. Cl.
  *H02N 15/00* (2006.01)
  *H01F 1/00* (2006.01)
(52) U.S. Cl.
  CPC ........... *H02N 15/00* (2013.01); *H01F 1/0018* (2013.01)

(58) Field of Classification Search
  CPC .................... H02N 15/00; H01F 1/0018
  See application file for complete search history.

(56) References Cited

U.S. PATENT DOCUMENTS 3,815,963 A * 6/1974 Wilk .................. H05B 6/32
                                                  310/90.5

FOREIGN PATENT DOCUMENTS

| JP | 2017046561 A * | 3/2017 | ............. H02N 15/00 |
| KR | 100745371 B1 | 8/2007 | |
| KR | 101281288 B1 | 4/2013 | |
| KR | 102202163 B1 | 1/2021 | |

OTHER PUBLICATIONS

Kim et al., Ji Hun, "Highly Mobile Levitating Soft Actuator Driven by Multistimuli-Responses," Advanced Materials Interfaces, pp. 1-9, Sep. 9, 2020.

* cited by examiner

*Primary Examiner* — Mohamad A Musleh
(74) *Attorney, Agent, or Firm* — HAUPTMAN HAM, LLP (57) ABSTRACT

The present invention relates to a soft robot using diamagnetic levitation. Such a soft robot using diamagnetic levitation is formed of a diamagnetic material to levitate on the ground on which a magnetic field is formed, and moves in a direction toward a predetermined point of a head part when the predetermined point of the head part is heated, and may thus move and change its direction in a state in which it is not in contact with the ground.

11 Claims, 12 Drawing Sheets

| N | S | N | S | N |
|---|---|---|---|---|
| S | N | S | N | S |
| N | S | N | S | N |
| S | N | S | N | S |
| N | S | N | S | N |

SOFT ROBOT USING DIAMAGNETIC LEVITATION

CROSS-REFERENCE TO RELATED APPLICATIONS

This application claims priority under 35 U.S.C. § 119 to Korean Patent Application No. 10-2021-0115199, filed on Aug. 31, 2021 and No. 10-2022-0063214, filed on May 24, 2022 in the Korean Intellectual Property Office, the disclosure of which is incorporated herein by reference in its entirety.

TECHNICAL FIELD

The following disclosure relates to a soft robot using diamagnetic levitation, and more particularly, to a soft robot using diamagnetic levitation that is formed of a diamagnetic material to diamagnetically levitate, is configured to be able to grip an object, and is capable of moving by a photothermal reaction.

BACKGROUND

Soft robots are robots formed of a flexible and stretchable material such as polymer and rubber, and are easily deformed and move smoothly. Such soft robots may move flexibly, and may thus be utilized in various fields such as medical care, exploration, disaster, and manufacture.

For example, the soft robots may be utilized as various robots such as a robot passing through an obstacle, a robot softly gripping an object, a robot capable of moving an object to another position, and an energy generator.

In order to operate the soft robot, the soft robot should be controlled by a means for controlling the movement of the soft robot. In a soft robot according to the related art, the movement of the soft robot is controlled through hydraulic pressure or electric energy transmitted through a cable.

However, in a case of the soft robot of which the movement is controlled through the cable, there is a problem that the cable may be twisted according to the movement of the soft robot. In addition, since a length of the cable is limited, there is a problem that an operating range of the soft robot which is connected to the cable and of which the movement is controlled is limited.

In order to solve such a problem, a soft robot of which an operation may be controlled wirelessly is developed and utilized. Since the soft robot of which the operation may be controlled wirelessly is not connected to the cable, a phenomenon in which the cable is twisted does not occur, and there is an advantage that an operation range of the soft robot is not limited.

However, since the soft robot of which the operation may be controlled wirelessly generally moves while in contact with the ground, there is a disadvantage that a moving speed of the soft robot is low. In addition, since the soft robot moves depending on friction with the ground, there is a problem that it is difficult or slow for the soft robot to change its direction while moving.

In addition, when the soft robot transports an object sensitive to a shock or shaking while in contact with the curved ground, there is a problem that the soft robot shakes or receives a shock, such that the object transported by the soft robot may be damaged.

Therefore, there is a need to develop a soft robot of which an operation may be controlled wirelessly and which may move in a state in which it is not in contact with the ground, and may thus move and change its direction at a high speed.

SUMMARY

An embodiment of the present invention is directed to providing a soft robot capable of moving and changing its direction at a high speed.

Another embodiment of the present invention is directed to providing a soft robot capable of transporting an object sensitive to a shock or shaking without damaging the object.

Still another embodiment of the present invention is directed to providing a soft robot of which an operation may be controlled wirelessly.

Yet still another embodiment of the present invention is directed to providing a soft robot capable of softly gripping an object sensitive to a shock.

Aspects of the present invention are not limited to the above-mentioned aspects, and other aspects that are not mentioned may be obviously understood by those skilled in the art from the following specification.

In one general aspect, a soft robot using diamagnetic levitation levitating on the ground on which a magnetic field is formed includes: a body part formed of a diamagnetic material having a film shape; one or more head parts formed of the diamagnetic material and connected to an outer peripheral edge of the body part; a plurality of grip parts formed of the diamagnetic material and connected to the outer peripheral edge of the body part; and a hygroscopic film of which an expansion rate according to absorption of moisture is different from that of the grip part and which is attached to a first surface of each of the grip parts facing the ground or a second surface of each of the grip parts opposite to the first surface, wherein when a predetermined point of the head part is heated, magnetic susceptibility of the predetermined point decreases, such that a diamagnetic levitation force of the predetermined point decreases.

When the expansion rate of the hygroscopic film according to the absorption of the moisture is greater than that of the grip part, the hygroscopic film may be attached to the first surface of the grip part, and when the expansion rate of the hygroscopic film according to the absorption of the moisture is smaller than that of the grip part, the hygroscopic film may be attached to the second surface of the grip part.

Two head parts may be connected to the body part so as to be symmetrical to each other with respect to a center of the body part.

The plurality of grip parts may be connected to the body part so as to be symmetrical to each other with respect to a virtual line connecting the center of the body part and a center of the head part to each other.

The grip part may be formed to extend in a length direction, and one side of the grip part in the length direction may be connected to the body part.

A plurality of grooves extending in a length direction and parallel to each other may be formed on the first surface or the second surface to which the hygroscopic film is attached.

The length direction of the plurality of grooves may be perpendicular to the length direction of the grip part.

The head part may be formed in a circular film shape.

The diamagnetic material may be pyrolytic graphite.

The hygroscopic film may be formed of a polymer material.

The polymer material may be Nafion.

Detailed contents of other exemplary embodiments for solving objects are described in a detailed description and are illustrated in the drawings.

DETAILED DESCRIPTION OF MAIN ELEMENTS

1: soft robot using diamagnetic levitation
10: body part
20: head part
30: grip part
40: hygroscopic film

DETAILED DESCRIPTION OF EMBODIMENTS

Hereinafter, embodiments of the present invention will be described in detail with reference to the accompanying drawings so that they may be easily practiced by those skilled in the art to which the present invention pertains. However, the present invention may be implemented in various different forms, and is not limited to embodiments described herein. In addition, in the drawings, portions unrelated to the description will be omitted in order to obviously describe the present invention, and similar reference numerals will be used to describe similar portions throughout the specification.

Throughout the present specification, when any one portion is referred to as being "connected to" another portion, it includes not only a case where any one portion and another portion are "directly connected to" each other, but also a case where any one portion and another portion are "electrically connected to" each other with the other element interposed therebetween.

Throughout the present specification, when any one member is referred to as being positioned "on" another member, it includes not only a case where any member and another member are in contact with each other, but also a case where the other member is interposed between any one member and another member.

Throughout the present specification, when any portion is referred to "including" any component, it means the inclusion of other components rather than the exclusion of other components unless otherwise stated. The terms indicating degrees, such as "about" and "substantially" used throughout the present specification are used as the meanings at numeral values or close to the numeral values when inherent manufacturing and material tolerances are suggested in the mentioned meanings, and are used in order to prevent an unconscionable infringer from making improper use of disclosed contents in which exact or absolute numeral values provided to assist in understanding of the present application are mentioned. The term "step of ~ing" or "step of ~" used throughout the present specification does not mean "step for ~".

Hereinafter, preferred embodiments of the present invention will be described in detail with reference to the accompanying drawings and contents to be described later. However, the present invention is not limited to embodiments herein, but may be implemented in other forms. Same reference numerals denote same constituent elements throughout the specification.

Hereinafter, a configuration of a soft robot using diamagnetic levitation according to an embodiment of the present invention will be described.

A soft robot 1 using diamagnetic levitation is formed of a diamagnetic material to be configured to levitate on the ground on which a magnetic field is formed. As the diamagnetic material forming the soft robot 1 using diamagnetic levitation, a material strongly repulsing an external magnetic field by an induced magnetic field formed in an opposite direction inside the material when the external magnetic field is applied, for example, graphite having strong diamagnetism may be used, and preferably pyrolytic graphite may be used.

Figure 1:
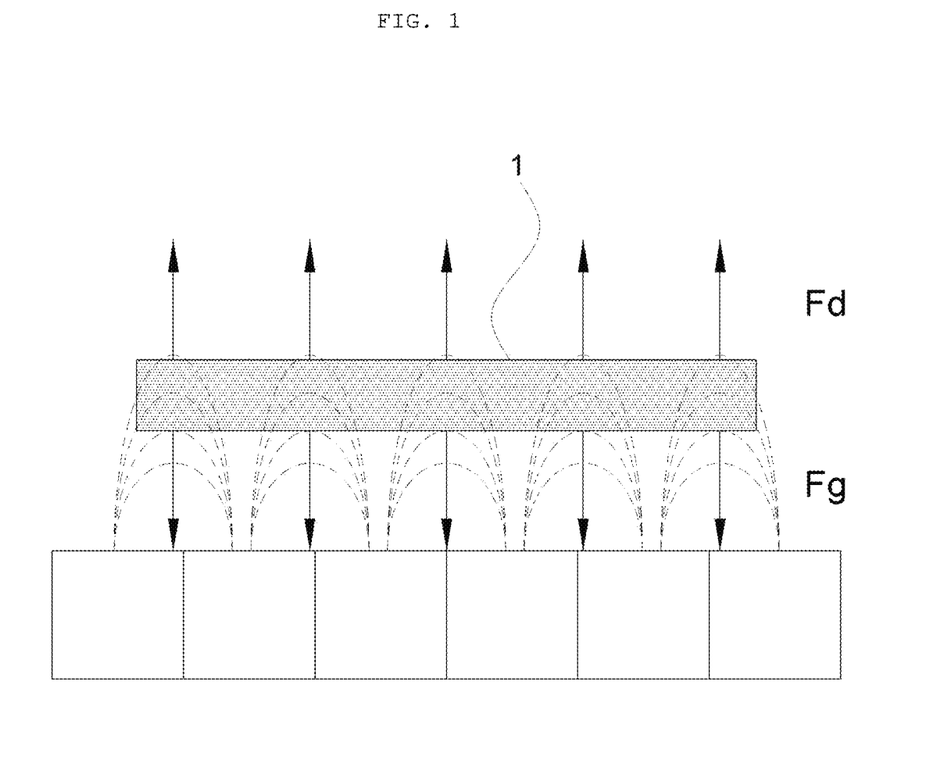
FIG. 1 is a view for describing a diamagnetic levitation principle of a soft robot using diamagnetic levitation.
Figure 2:
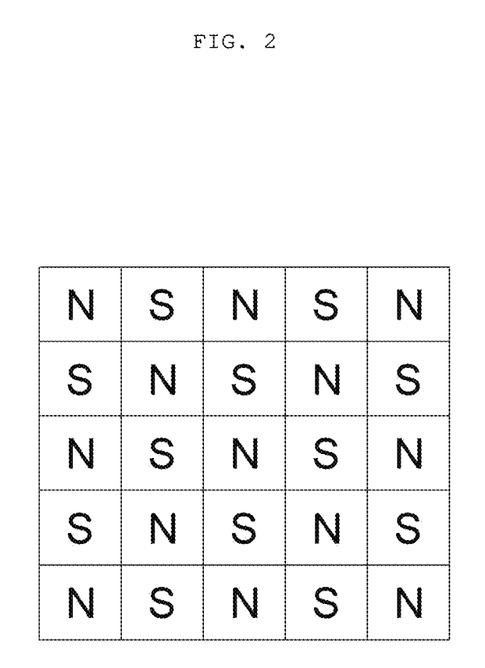
FIG. 2 is a view illustrating an example of the ground on which a magnetic field is formed.

FIG. 1 is a view for describing a diamagnetic levitation principle of a soft robot using diamagnetic levitation, and FIG. 2 is a view illustrating an example of the ground on which a magnetic field is formed.

As illustrated in FIG. 1, when the soft robot 1 using diamagnetic levitation is positioned on the ground on which a magnetic field is formed, gravity $F_g$ and a diamagnetic levitation force $F_d$ acting on the soft robot 1 using diamagnetic levitation are balanced, such that the soft robot 1 using diamagnetic levitation levitates on the ground.

In this case, the ground on which the magnetic field is formed may have a structure in which N poles and S poles are alternately arranged in a checkboard arrangement structure, as illustrated in FIG. 2.

Figure 3:
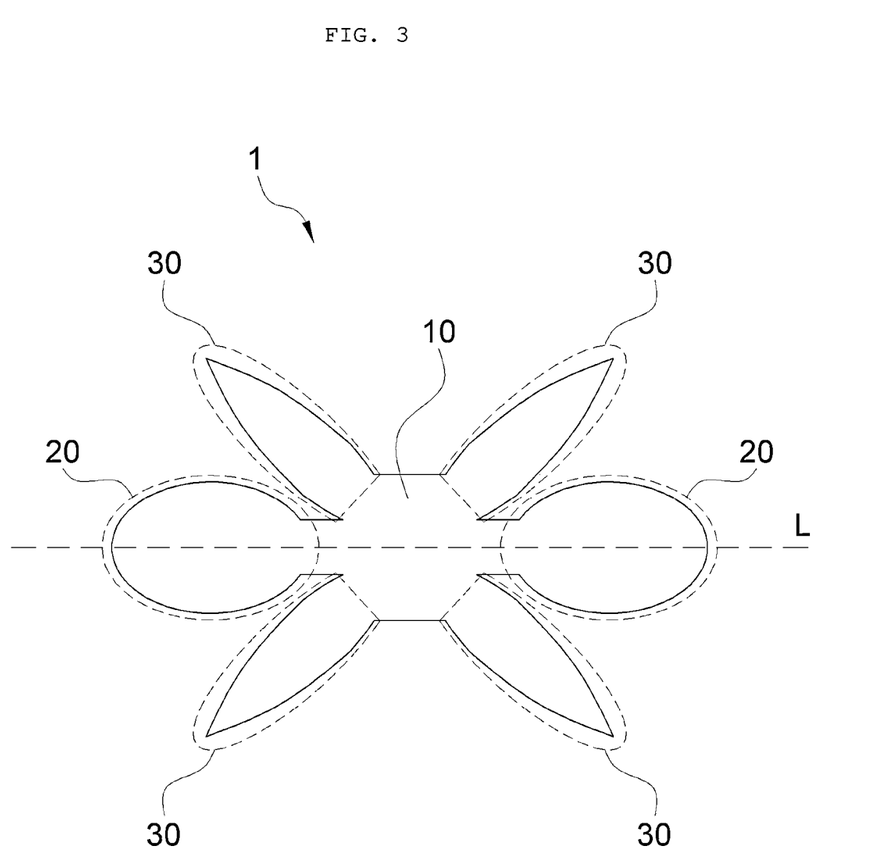
FIG. 3 is a plan view illustrating a soft robot using diamagnetic levitation according to an embodiment of the present invention.

FIG. 3 is a plan view illustrating a soft robot using diamagnetic levitation according to an embodiment of the present invention.

Referring to FIG. 3, the soft robot 1 using diamagnetic levitation includes a body part 10, head parts 20, and grip parts 30, and includes a hygroscopic film 40 (not illustrated in FIG. 3).

First, the body part 10 will be described.

The body part 10 may be formed of a diamagnetic material having a film shape. The diamagnetic material forming the body part 10 may be pyrolytic graphite.

The body part 10 may be formed in a shape such as a circular film shape, an elliptical film shape, or a polygonal film shape, but a shape of the body part 10 is not particularly limited.

Next, the head part 20 will be described.

The head part 20 may be formed of a diamagnetic material having a film shape, such as pyrolytic graphite, and one or more heat parts 20 may be connected to the body part 10. For example, as illustrated in FIG. 3, two head parts 20 may be connected to the body part 10 so as to be symmetrical to each other with respect to the center of the body part 10.

Such a head part 20 may be formed in a shape such as a circular film shape, an elliptical film shape, or a polygonal film shape, but a shape of the head part 20 is not particularly limited.

Meanwhile, the soft robot 1 using diamagnetic levitation may be moved by heating a predetermined point of the head part 20.

Figure 4:
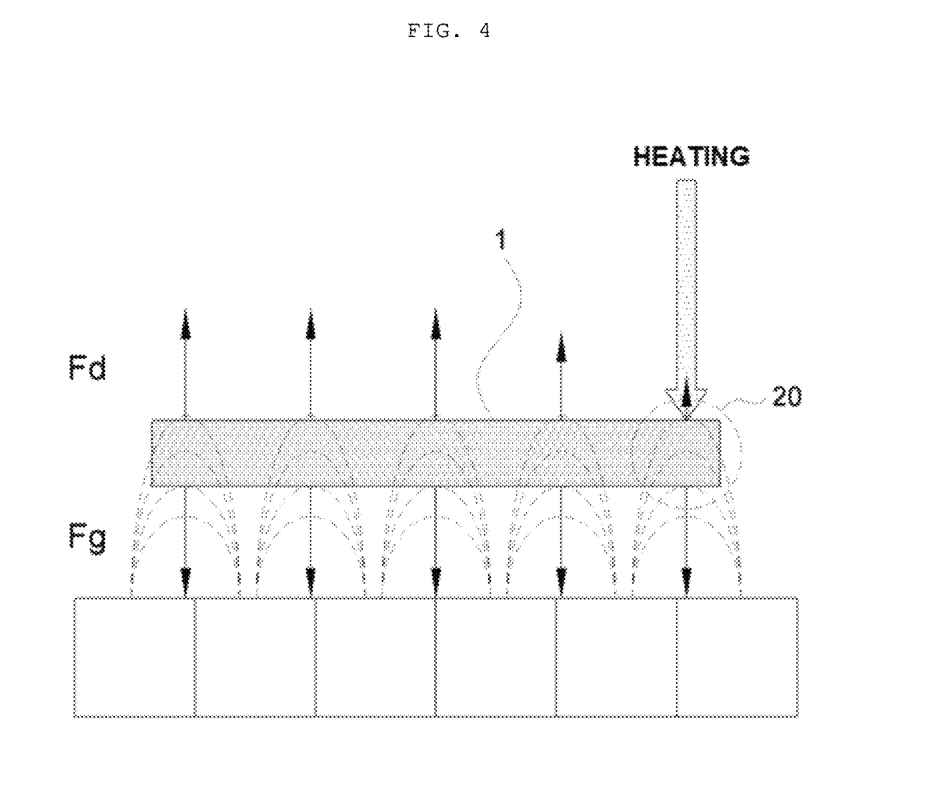
FIG. 4 is a side view illustrating the soft robot using diamagnetic levitation in which a predetermined point of a head part is heated, such that magnetic susceptibility of the predetermined point is decreased.

FIG. 4 is a side view illustrating the soft robot using diamagnetic levitation in which a predetermined point of a head part is heated, such that magnetic susceptibility of the predetermined point is decreased.

As illustrated in FIG. 4, when a predetermined point of the head part 20 is heated, the magnetic susceptibility of the predetermined point decreases, and as a result, a diamagnetic levitation force $F_d$ of the predetermined point decreases.

Figure 5:
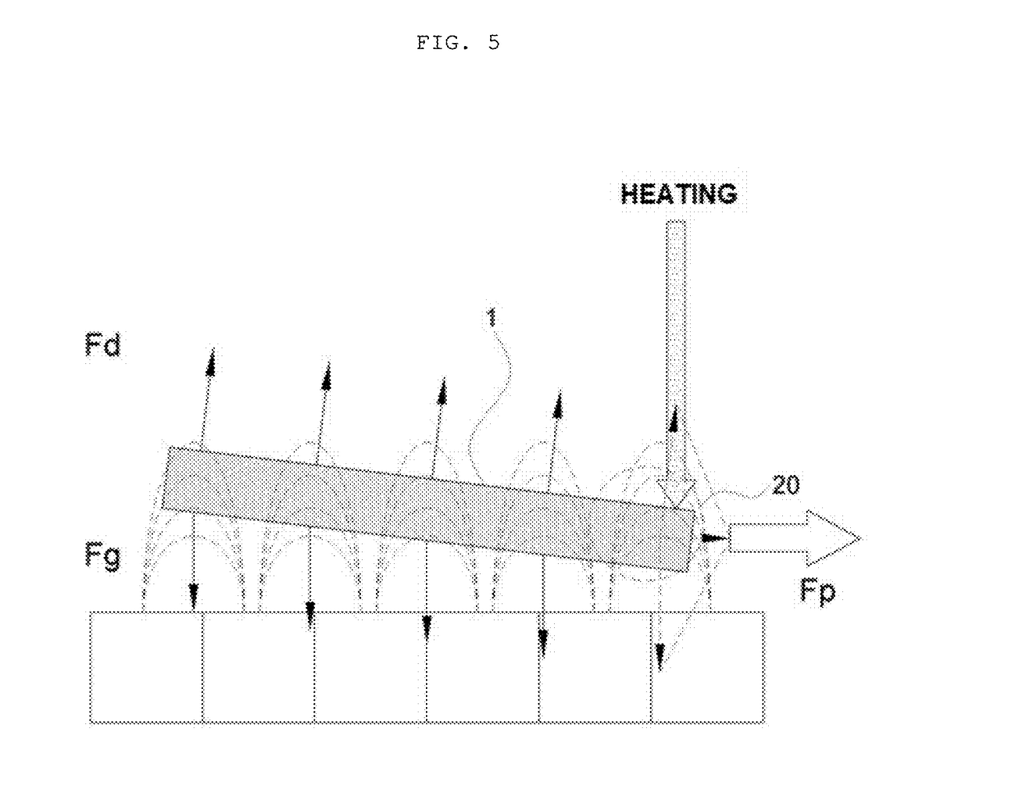
FIG. 5 is a side view illustrating the soft robot using diamagnetic levitation moved in a direction toward the predetermined point as the magnetic susceptibility of the predetermined point of the head part is decreased.

FIG. 5 is a side view illustrating the soft robot using diamagnetic levitation moved in a direction toward the predetermined point as the magnetic susceptibility of the predetermined point of the head part is decreased.

In addition, as illustrated in FIG. 5, when the diamagnetic levitation force $F_d$ at a predetermined point of the head part 20 decreases, the predetermined point is tilted in a direction toward the ground, and a moving force $F_p$ is generated in the direction toward the predetermined point.

As such, when the predetermined point of the head part 20 is heated, the moving force $F_p$ is generated in the direction toward the predetermined point, and thus, the soft robot 1 using diamagnetic levitation moves in the direction toward the heated predetermined point of the head part 20. Therefore, the soft robot 1 using diamagnetic levitation may be moved in various directions by heating the predetermined point of the head part 20.

Figure 6:
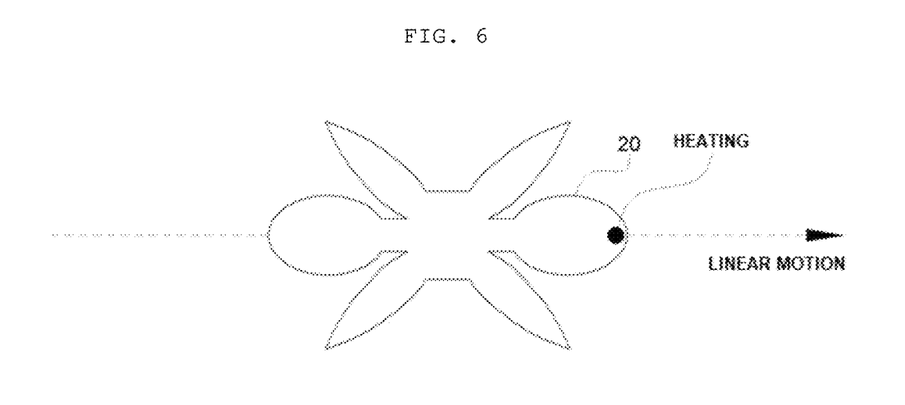
FIG. 6 is a plan view illustrating the soft robot using diamagnetic levitation performing a linear motion by heating the predetermined point of the head part.

FIG. 6 is a plan view illustrating the soft robot using diamagnetic levitation performing a linear motion by heating the predetermined point of the head part.

As an example, as illustrated in FIG. 6, when the predetermined point of the head part 20 is heated, the soft robot 1 using diamagnetic levitation moves in the direction toward the heated predetermined point of the head part 20 to perform a linear motion.

Figure 7:
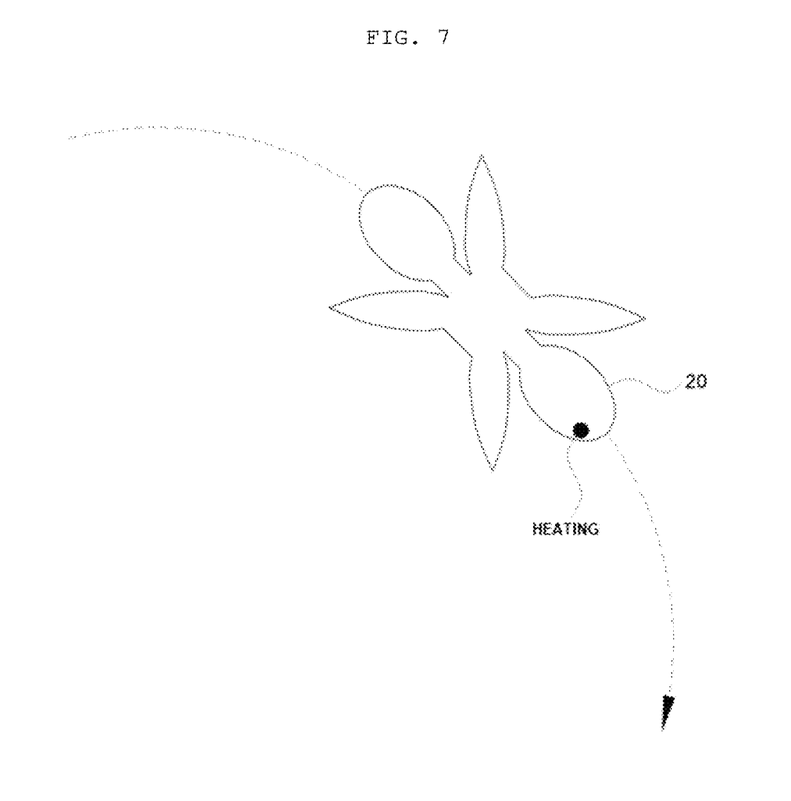
FIG. 7 is a plan view illustrating a soft robot using diamagnetic levitation performing a curved motion by heating the predetermined point of the head part.

FIG. 7 is a plan view illustrating a soft robot using diamagnetic levitation performing a curved motion by heating the predetermined point of the head part.

As another example, as illustrated in FIG. 7, when the predetermined point of the head part 20 is heated, the soft robot 1 using diamagnetic levitation moves in the direction toward the heated predetermined point of the head part 20 to perform a curved motion.

There may be various methods of heating the head part 20, and the head part 20 may be heated by irradiating the head part 20 with a laser beam from a long distance. As such, when the head part 20 is heated by irradiating the head part 20 with the laser beam from the long distance, an operation of the soft robot 1 using diamagnetic levitation may be controlled wirelessly.

Next, the grip part 30 will be described.

The grip part 30 may be formed of pyrolytic graphite or the like, which is a diamagnetic material formed to extend in a length direction and having a film shape, and one side of the grip part 30 in the length direction may be connected to the body part 10.

In addition, as illustrated in FIG. 3, a plurality of grip parts 30 may be connected to the body part 10 so as to be symmetrical to each other with respect to a virtual line L connecting the center of the body part 10 and the center of the head part 20 to each other.

A hygroscopic film 40 expanding when absorbing moisture may be attached to the grip part 30 so that the grip part 30 may be bent to grip an object loaded on the body part 10. It is preferable that an expansion rate of the hygroscopic film 40 according to the absorption of the moisture is different from that of the grip part 30.

Figure 8:
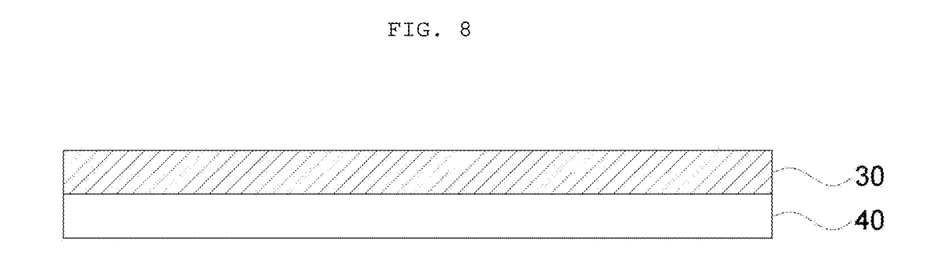
FIG. 8 is a side view illustrating a grip part to which a hygroscopic film is attached.

FIG. 8 is a side view illustrating a grip part to which a hygroscopic film is attached.

Specifically, referring to FIG. 8, the hygroscopic film 40 may be attached to a first surface of each grip part 30 facing the ground or a second surface of each grip part 30 opposite to the first surface.

Since the expansion rate of the hygroscopic film 40 according to the absorption of the moisture is different from that of the grip part 30, when the grip part 30 and the hygroscopic film 40 absorb or release the moisture, the grip part 30 and the hygroscopic film 40 are bent or unbent in a predetermined direction.

Figure 9:
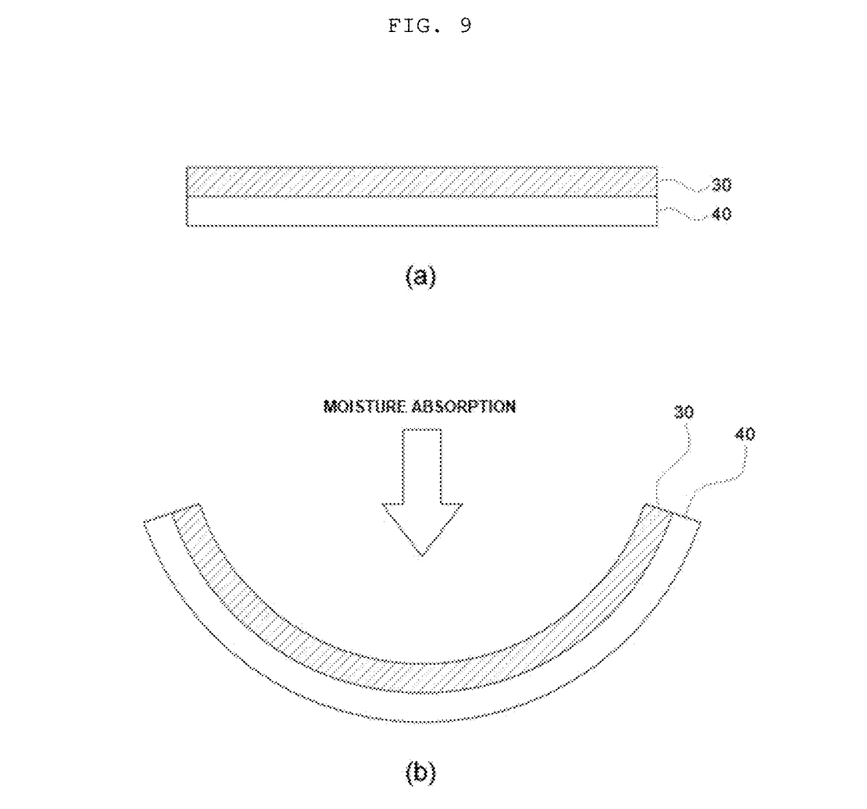
FIGS. 9A and 9B are side views illustrating the grip part and the hygroscopic film bent by absorbing moisture.

FIGS. 9A and 9B are side views illustrating the grip part and the hygroscopic film bent by absorbing moisture.

For example, referring to FIGS. 9A and 9B, the hygroscopic film 40 of which the expansion rate according to the absorption of the moisture is greater than that of the grip part 30 is attached to the first surface of the grip part 30 facing the ground, and when the grip part 30 and the hygroscopic film 40 absorb the moisture, the grip part 30 and the hygroscopic film 40 are bent in a concave shape when viewed in a direction toward the ground. In addition, when the grip part 30 and the hygroscopic film 40 release the moisture, the grip part 30 and the hygroscopic film 40 are unbent to be flat.

Since the grip part 30 and the hygroscopic film 40 should be able to be bent to grip the object loaded on the body part 10, it is preferable that the grip part 30 and the hygroscopic film 40 are bent in the concave shape when viewed from the direction toward the ground when they absorb the moisture.

Therefore, it is preferable that the hygroscopic film 40 is attached to the first surface of the grip part 30 facing the ground when the expansion rate of the hygroscopic film 40 according to the absorption of the moisture is greater than that of the grip part 30, and it is preferable that the hygroscopic film 40 is attached to the second surface of the grip part 30 opposite to the first surface when the expansion rate of the hygroscopic film 40 according to the absorption of the moisture is smaller than that of the grip part 30.

The hygroscopic film 40 attached to the grip part 30 may be formed of a polymer material, for example, Nafion.

When the hygroscopic film 40 is formed of Nafion and the grip part 30 is formed of the pyrolytic graphite, since the expansion rate of the hygroscopic film 40 according to the absorption of the moisture is greater than that of the grip part 30 according to the absorption of the moisture, it is preferable that the hygroscopic film 40 is attached to the first surface of the grip part 30 facing the ground.

Meanwhile, a plurality of grooves may be formed on the first surface or the second surface of the grip part 30 to which the hygroscopic film 40 is attached.

Figure 10:
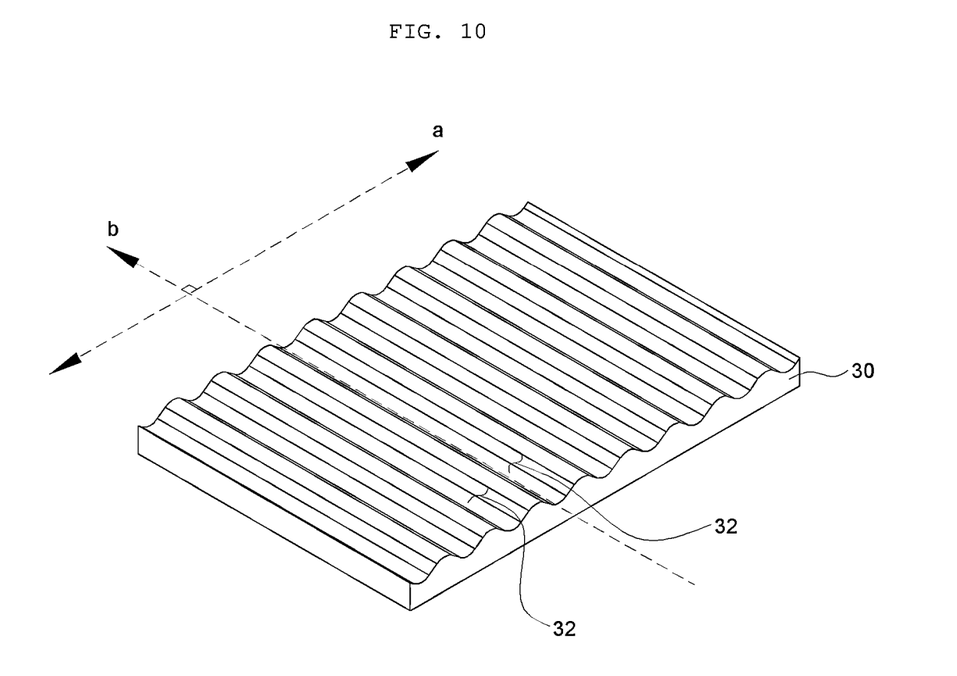
FIG. 10 is a view illustrating the grip part having a plurality of grooves formed on a surface thereof to which the hygroscopic film is attached.

FIG. 10 is a view illustrating the grip part having a plurality of grooves formed on a surface thereof to which the hygroscopic film is attached.

Referring to FIG. 10, a plurality of grooves 32 extending in a length direction and parallel to each other may be formed on the first surface or the second surface of the grip part 30 to which the hygroscopic film 40 is attached.

As such, when the plurality of grooves 32 are formed on the first surface or the second surface of the grip part 30, a bending moment of inertia in a direction (direction a) perpendicular to a length direction (direction b) of the grooves 32 decreases. Therefore, when the grip part 30 and the hygroscopic film 40 absorb the moisture, axes of the grip part 30 and the hygroscopic film 40 are bent in the direction (direction a) perpendicular to the length direction (direction b) of the grooves 32.

Figure 11:
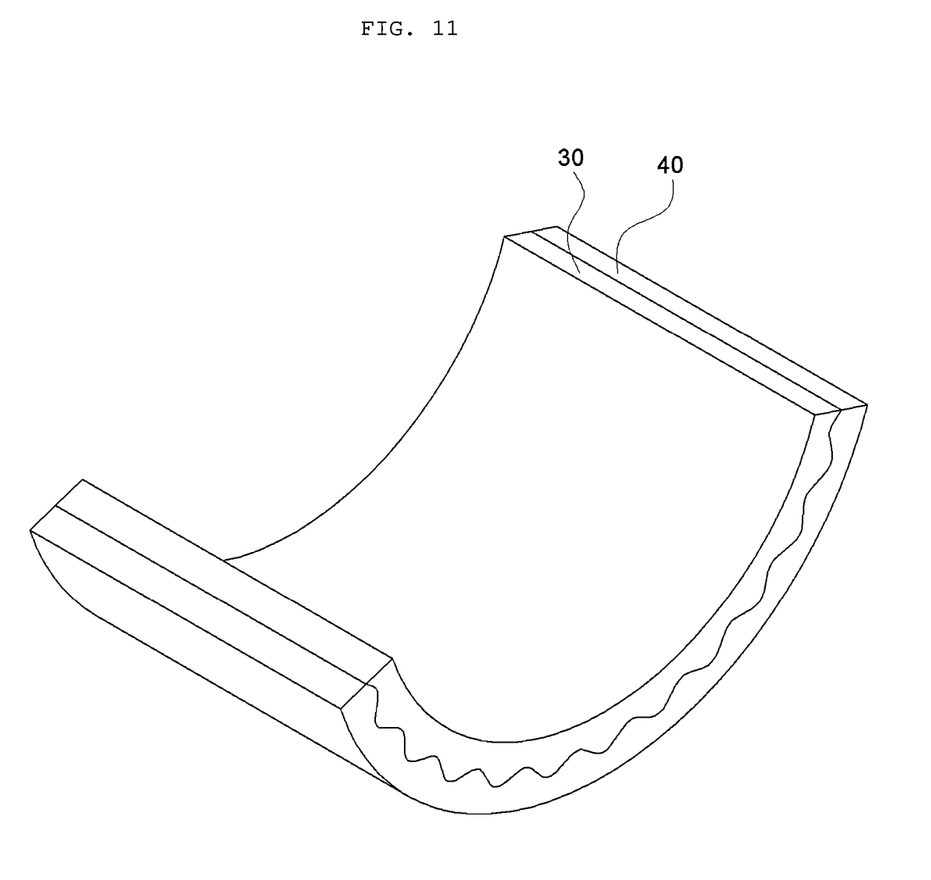
FIG. 11 is a view illustrating the grip part and the hygroscopic film of which axes in a direction perpendicular to a length direction of the plurality of grooves are bent.

FIG. 11 is a view illustrating the grip part and the hygroscopic film of which axes in a direction perpendicular to a length direction of the plurality of grooves are bent.

For example, as illustrated in FIG. 11, when the grip part 30 and the hygroscopic film 40 absorb the moisture, axes of the grip part 30 and the hygroscopic film 40 in the direction perpendicular to the length direction of the grooves 32 are bent.

By using such a principle, it is possible to effectively grip the object loaded on the body part 10 by presetting a direction in which the grip part 30 and the hygroscopic film 40 are bent when the grip part 30 and the hygroscopic film 40 absorb the moisture.

Specifically, when the plurality of grooves 32 are formed in the grip part 30 so that the length direction of the plurality of grooves 32 is perpendicular to the length direction of the grip part 30, when the grip part 30 and the hygroscopic film 40 absorb the moisture, the axis of the grip part 30 in the length direction may be bent.

Figure 12:
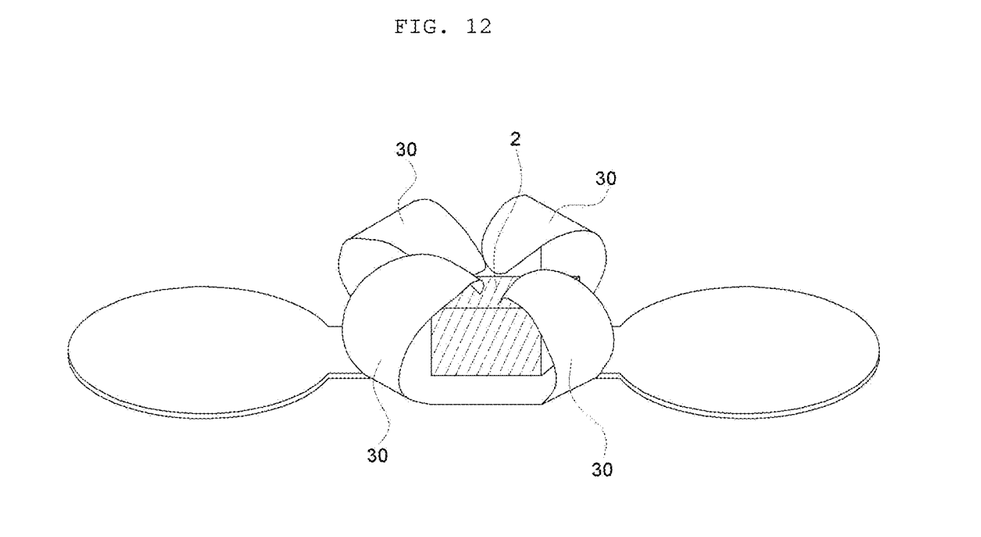
FIG. 12 is a view illustrating a state in which the grip part and the hygroscopic film absorb the moisture and are accordingly bent to grip an object loaded on a body part.

FIG. 12 is a view illustrating a state in which the grip part and the hygroscopic film absorb the moisture and are accordingly bent to grip an object loaded on a body part.

As illustrated in FIG. 12, since one side of the grip part 30 in the length direction is connected to the body part 10, when the grip part 30 and the hygroscopic film 40 absorb the moisture, the axis of the grip part 30 in the length direction is bent, such that the grip part 30 may easily grip the object loaded on the body part 10.

As such, in order to unbend the grip part 30 and the hygroscopic film 40 that are bent to grip the object, the moisture should be released from the grip part 30 and the hygroscopic film 40. As a method of releasing the moisture from the grip part 30 and the hygroscopic film 40, there may be a method of heating the grip part 30 and the hygroscopic film 40.

Figure 13:
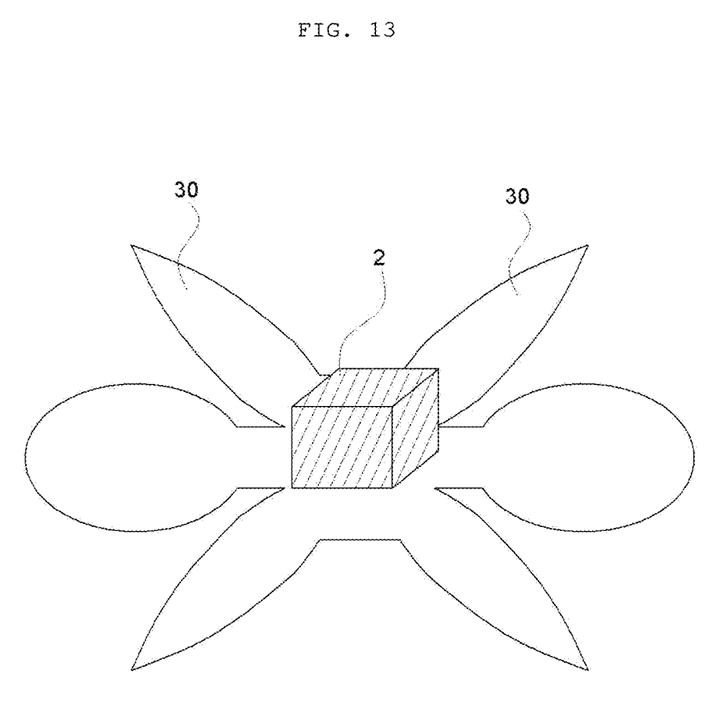
FIG. 13 is a view illustrating a state in which the grip part and the hygroscopic film release the moisture and are accordingly unbent.

FIG. 13 is a view illustrating a state in which the grip part and the hygroscopic film release the moisture and are accordingly unbent.

As illustrated in FIG. 13, when the moisture is released from the grip part 30 and the hygroscopic film 40 by heating the grip part 30 and the hygroscopic film 40, the grip part 30 and the hygroscopic film 40 are unbent, and thus, do not grip the object loaded on the body part 10.

Meanwhile, the grip part 30 and the hygroscopic film 40 of the soft robot 1 using diamagnetic levitation according to the present invention are reversible even though a process of absorbing and releasing moisture is repeated.

Figure 14:
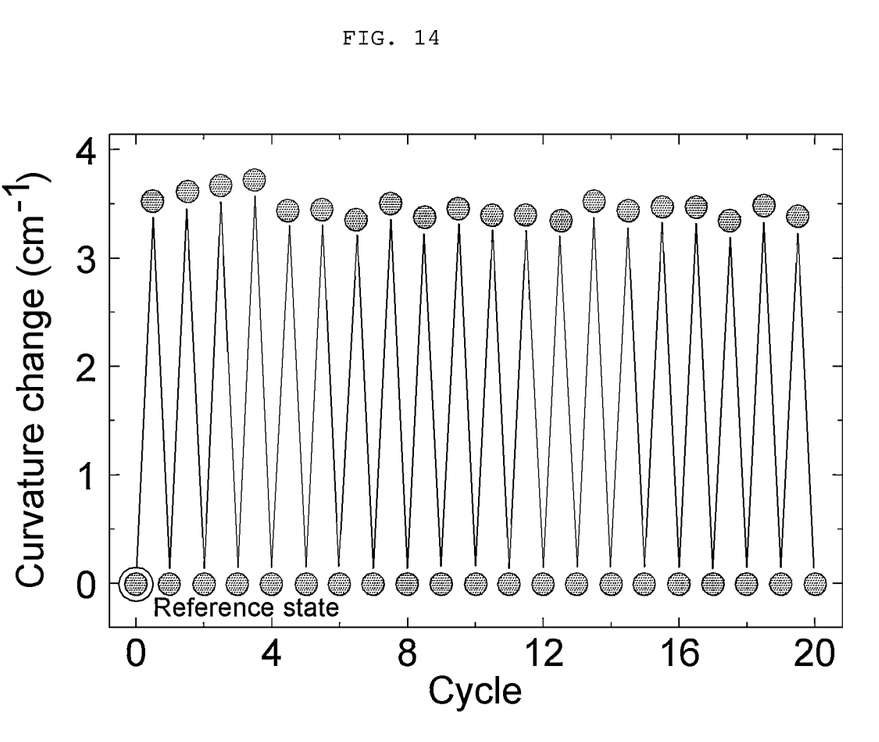
FIG. 14 is a graph illustrating curvature changes of the grip part and the hygroscopic film according to a moisture absorption and release cycle.

FIG. 14 is a graph illustrating curvature changes of the grip part and the hygroscopic film according to a moisture absorption and release cycle.

Specifically, as illustrated in the graph of FIG. 14, it can be seen that a curvature change of the grip part 30 and the hygroscopic film 40 according to the absorption of the moisture and a curvature change of the grip part 30 and the hygroscopic film 40 according to the release of the moisture are not great even though a moisture absorption and release cycle is repeated.

Hereinafter, an operation and an effect of the soft robot 1 using diamagnetic levitation according to the present invention will be described.

The object is loaded on the body part 10 in order to transport the object with the soft robot 1 using diamagnetic levitation levitating on the ground where the magnetic field is formed. In addition, when the moisture is applied to the grip part 30 and the hygroscopic film 40, the grip part 30 and the hygroscopic film 40 are bent to grip the object mounted on the body part 10.

Next, the predetermined point of the head part 20 is heated in order to move the soft robot 1 using diamagnetic levitation loaded with the object. In this case, the predetermined point of the head part 20 may be heated through the laser beam irradiated from a long distance.

When the predetermined point of the head part 20 is heated, the soft robot 1 using diamagnetic levitation moves in the direction toward the predetermined point. In this case, the soft robot 1 using diamagnetic levitation may be moved in various directions by adjusting a position of the predetermined point of the head part 20.

When the movement of the soft robot 1 using diamagnetic levitation ends, the grip part 30 and the hygroscopic film 40 are heated. When the grip part 30 and the hygroscopic film 40 are heated, the grip part 30 and the hygroscopic film 40 release the moisture and are accordingly unbent, and do not grip the object.

In addition, when the grip part 30 and the hygroscopic film 40 do not grip the object as described above, the object loaded on the soft robot 1 using diamagnetic levitation may be recovered.

As described above, the soft robot 1 using diamagnetic levitation according to the present invention is formed of the diamagnetic material to levitate on the ground on which the magnetic field is formed, and moves in the direction toward the predetermined point of the head part when the predetermined point of the head part is heated. Therefore, the soft robot 1 using diamagnetic levitation according to the present invention may move and change its direction in a state in which it is not in contact with the ground, and thus, may move and change its direction at a high speed.

In addition, the soft robot 1 using diamagnetic levitation according to the present invention moves in a state in which it levitates on the ground without contact with the curved ground and thus, does not apply a shock to the object to be transported. Therefore, the soft robot 1 using diamagnetic levitation may transport an object sensitive to a shock or shaking without damaging the object.

In addition, the soft robot 1 using diamagnetic levitation according to the present invention may move by heating the predetermined point of the head part from the long distance, and thus, an operation of the soft robot 1 using diamagnetic levitation may be controlled wirelessly, such that an operation range of the soft robot 1 using diamagnetic levitation is not limited.

In addition, the soft robot 1 using diamagnetic levitation according to the present invention grips the object with the soft diamagnetic material having the film shape, and thus, may softly grip the object sensitive to the shock without damaging the object.

The description of the present invention provided above is illustrative, and it is to be understood by those skilled in the art that various modifications and alterations may be made without departing from the spirit or essential feature of the present invention. Therefore, it is to be understood that the embodiments described above are illustrative rather than being restrictive in all aspects. For example, respective components described as a single form may be implemented in a distributed manner, and similarly, components described as being distributed may also be implemented in a combined form.

It is to be understood that the scope of the present invention will be defined by the claims rather than the detailed description provided above and all modifications and alterations derived from the claims and their equivalents fall within the scope of the present invention.

What is claimed is:

1. A soft robot using diamagnetic levitation levitating on the ground on which a magnetic field is formed, comprising:
   a body part formed of a diamagnetic material having a film shape;
   one or more head parts formed of the diamagnetic material and connected to an outer peripheral edge of the body part;
   a plurality of grip parts formed of the diamagnetic material and connected to the outer peripheral edge of the body part; and
   a hygroscopic film of which an expansion rate according to absorption of moisture is different from that of the grip part and which is attached to a first surface of each of the grip parts facing the ground or a second surface of each of the grip parts opposite to the first surface,
   wherein when a predetermined point of the head part is heated, magnetic susceptibility of the predetermined point decreases, such that a diamagnetic levitation force of the predetermined point decreases.

2. The soft robot using diamagnetic levitation of claim 1, wherein when the expansion rate of the hygroscopic film according to the absorption of the moisture is greater than that of the grip part, the hygroscopic film is attached to the first surface of the grip part, and
   when the expansion rate of the hygroscopic film according to the absorption of the moisture is smaller than that of the grip part, the hygroscopic film is attached to the second surface of the grip part.

3. The soft robot using diamagnetic levitation of claim 2, wherein two head parts are connected to the body part so as to be symmetrical to each other with respect to a center of the body part.

4. The soft robot using diamagnetic levitation of claim 3, wherein the plurality of grip parts are connected to the body part so as to be symmetrical to each other with respect to a virtual line connecting the center of the body part and a center of the head part to each other.

5. The soft robot using diamagnetic levitation of claim 4, wherein the grip part is formed to extend in a length direction, and one side of the grip part in the length direction is connected to the body part.

6. The soft robot using diamagnetic levitation of claim 5, wherein a plurality of grooves extending in a length direction and parallel to each other are formed on the first surface or the second surface to which the hygroscopic film is attached.

7. The soft robot using diamagnetic levitation of claim 6, wherein the length direction of the plurality of grooves is perpendicular to the length direction of the grip part.

8. The soft robot using diamagnetic levitation of claim 7, wherein the head part is formed in a circular film shape.

9. The soft robot using diamagnetic levitation of claim 7, wherein the diamagnetic material is pyrolytic graphite.

10. The soft robot using diamagnetic levitation of claim 9, wherein the hygroscopic film is formed of a polymer material.

11. The soft robot using diamagnetic levitation of claim 10, wherein the polymer material is Nafion.

\* \* \* \* \*